United States Patent
Huang

(10) Patent No.: US 11,856,958 B2
(45) Date of Patent: Jan. 2, 2024

(54) METHOD FOR FORMING STUFFED FOOD

(71) Applicant: SHANGHAI SOONTRUE MACHINERY EQUIPMENT CO., LTD., Shanghai (CN)

(72) Inventor: Song Huang, Shanghai (CN)

(73) Assignee: SHANGHAI SOONTRUE MACHINERY EQUIPMENT CO., LTD., Shanghai (CN)

( * ) Notice: Subject to any disclaimer, the term of this patent is extended or adjusted under 35 U.S.C. 154(b) by 1076 days.

(21) Appl. No.: 16/616,194

(22) PCT Filed: Mar. 9, 2018

(86) PCT No.: PCT/CN2018/078536
§ 371 (c)(1),
(2) Date: Nov. 22, 2019

(87) PCT Pub. No.: WO2019/062033
PCT Pub. Date: Apr. 4, 2019

(65) Prior Publication Data
US 2020/0260739 A1    Aug. 20, 2020

(30) Foreign Application Priority Data
Sep. 30, 2017  (CN) .......................... 201710913612.3

(51) Int. Cl.
*A21C 9/06* (2006.01)
*A21D 13/31* (2017.01)
(Continued)

(52) U.S. Cl.
CPC ................ *A21C 9/063* (2013.01); *A21C 5/00* (2013.01); *A21C 9/085* (2013.01); *A21C 11/10* (2013.01); *A21D 13/31* (2017.01); *B65G 29/00* (2013.01)

(58) Field of Classification Search
CPC . A21C 5/00–08; A21C 9/00; A21C 9/06–068; A21C 9/08; A21C 9/085;
(Continued)

(56) References Cited

U.S. PATENT DOCUMENTS 1,742,774 A  *  1/1930  Mairich ................... A21C 5/04
                                                          425/241
2,226,084 A  *  12/1940  Turner ................... A21C 11/10
                                                          226/170
(Continued)

FOREIGN PATENT DOCUMENTS

CA          2286524 A1  *  4/2001  ............. A21C 9/066
CN       204697808 U   *  10/2015
(Continued)

*Primary Examiner* — Drew E Becker
*Assistant Examiner* — Austin Parker Taylor

(57) ABSTRACT

A method for forming stuffed food includes steps of: step 1: sending and cutting dough wrappers; wherein shaping molds (1001) on a rotation disc (101) are arranged below a sending and cutting station (20); the dough wrappers are cut into pre-set shapes before dropping in the shaping molds (1001); unused dough enters an opening (106) on the rotation disc (101) and is transported downwardly, so as to be collected; and step 2: filling the dough wrappers with stuffing; wherein the shaping molds (1001) transport the dough wrappers to a stuffing injection station (30) where the stuffing is injected onto the dough wrappers. According to the method, the opening on the rotation assembly collects the unused dough and takes full advantage of the space below the rotation assembly. A recycling bin is placed below the opening to collect the unused dough.

4 Claims, 15 Drawing Sheets

(51) Int. Cl.
*A21C 9/08* (2006.01)
*A21C 11/10* (2006.01)
*B65G 29/00* (2006.01)
*A21C 5/00* (2006.01)

(58) Field of Classification Search
CPC ......... A21C 9/088; A21C 11/00; A21C 11/02; A21C 11/10; A21C 11/103; A21C 11/12; A21C 11/14; A21C 14/00; A21D 13/30; A21D 13/31; A23P 30/10; A47J 44/00; B26D 2210/02; B26D 2210/04; B65G 29/00; B65G 13/00–12
USPC .......... 426/282, 283, 391, 496, 503; 99/494, 99/537
See application file for complete search history.

(56) References Cited

U.S. PATENT DOCUMENTS

| | | | | | |
|---|---|---|---|---|---|
| 2,445,742 | A | * | 7/1948 | Hoch | B29C 33/446 65/316 |
| 2,929,341 | A | * | 3/1960 | Zoeller | A21C 11/10 83/40 |
| 3,626,466 | A | * | 12/1971 | Liepa | A47J 37/1214 99/404 |
| 3,888,997 | A | * | 6/1975 | Guibert | B01F 35/75455 426/549 |
| 4,556,379 | A | * | 12/1985 | Ikishima | B30B 15/302 425/371 |
| 4,582,472 | A | * | 4/1986 | Hanson | A21C 9/088 425/150 |
| 4,583,930 | A | * | 4/1986 | Hayashi | A21C 3/027 425/371 |
| 5,112,208 | A | * | 5/1992 | Voth | A21C 3/02 425/363 |
| 8,043,539 | B2 | * | 10/2011 | Ozasa | B29C 43/003 264/319 |
| 2011/0097467 | A1 | * | 4/2011 | Van Blokland | A21C 9/088 426/496 |
| 2012/0219674 | A1 | * | 8/2012 | Lee | A21C 9/061 426/283 |

FOREIGN PATENT DOCUMENTS

| | | | | |
|---|---|---|---|---|
| CN | 105851109 A | * | 8/2016 | ............ A21C 11/10 |
| KR | 20150113320 A | * | 10/2015 | |

* cited by examiner

METHOD FOR FORMING STUFFED FOOD

CROSS REFERENCE OF RELATED APPLICATION

This is a U.S. National Stage under 35 U.S.C 371 of the International Application PCT/CN2018/078536, filed Mar. 9, 2018, which claims priority under 35 U.S.C. 119(a-d) to CN 201710913612.3, filed Sep. 30, 2017.

BACKGROUND OF THE PRESENT INVENTION

Field of Invention

The present invention relates to a technical field of food processing, and more particularly to a method for forming stuffed food.

Description of Related Arts

When forming stuffed food, the volume of the conventional equipment is usually large, and space consumption of the dough wrapper processing device is particularly prominent. How to reduce the size of the machine for forming stuffed food is a challenge in the food processing field.

The Chinese patent application CN200820062031.X (filing date: Jan. 29, 2018) disclosed a dumpling making machine which comprises a dough wrapper feeding unit, a stuffing injection unit, a dumpling forming unit, a discharge tailstock and a driving unit. The dumpling forming unit comprises a horizontal station rotation disc, a forming mold on the surface of the rotation disc, a dough wrapper feeding apparatus, a dough wrapper receiving station and a stuffing receiving station which are corresponding to the stuffing injection unit and are arranged on the rotation disc; a jacking unit is arranged at the folding station, one side of a dumpling pushing station is provided with a push unit, and the other side is provided with the discharge tailstock; under the control of guide rails, the molds performs actions such as flattening, clamping, opening, and unfolding in different stations.

Furthermore, a Chinese patent application CN201610274834.0 (filing date: Apr. 28, 2016) disclosed a compact stuffed food shaping machine. The invention belongs to the technical field of food processing and in particular relates to a compact stuffed food shaping machine. The shaping machine comprises a rack and a station rotation disc arranged on the rack, wherein a dough wrapper forming device, a stuffing injection device, a pressing device and a discharging device are respectively arranged around the station rotation disc; a wrapper forming station is arranged on the wrapper forming device; a stuffing injection station is arranged on the stuffing injection device; a pressing station is arranged on the pressing device; a discharging station is arranged on the discharging device; a split shaping mold is also arranged on the rack and comprises a rotary wrapper receiving plate and molding cups.

When feeding and forming stuffed food with the above inventions, no matter which one is adopted, no convenient and space-saving solution can be proposed for the treatment of unused dough after cutting. As a result, the volume of the whole equipment cannot be further reduced. At the same time, due to the complicated structure of the unused dough collection device, the whole equipment has too many process controlling points, high failure rate, and high maintenance and use costs.

SUMMARY OF THE PRESENT INVENTION

To further reduce the size of the conventional machines, an object of the present invention is to provide a method for forming stuffed food, which is able to effectively process dough wrappers and collect unused wrappers.

Accordingly, in order to accomplish the above objects, the present invention provides:

a method for forming stuffed food, comprising steps of:
step 1: sending and cutting dough wrappers; wherein shaping molds on a rotation disc is arranged below a sending and cutting station; the dough wrappers are cut into pre-set shapes before dropping in the shaping mold; unused dough enters an opening on the rotation disc and is transported downwardly, so as to be collected; and
step 2: filling the dough wrappers with stuffing; wherein the shaping molds transport the dough wrappers to a stuffing injection station where the stuffing is injected onto the dough wrappers.

Preferably, the method further comprises steps of:
step 3: pressing and shaping; wherein the shaping molds are transported by the rotation disc to a shaping station where the dough wrappers are pressed and shaped; and
step 4: outputting final products; wherein the shaping molds are transported to a discharge station, so as to output the final products.

To achieve the above method, the present invention provides a forming machine for the stuffed food, which comprises a framework and a rotation assembly on the framework; wherein at least the sending and cutting station and the stuffing injection station are arranged around the rotation assembly; the rotation assembly has the opening for collecting the unused dough from the sending and cutting station; a distance between an internal side of the shaping molds and a center of the rotation assembly is larger than a distance between an internal side of the opening and the center of the rotation assembly.

The stuffed food processed in the present invention comprises all kinds of stuffed foods such as dumplings, Tang-yuan, buns and Shao-mai. Taking the process of making dumpling as an example, the dough wrappers before the cutting process is called a dumpling dough belt, and wrappers obtained according to a shape of the cutter after the cutting process is called dough wrappers. During the cutting process, the remaining dough is called unused dough. When a distance between an internal side of the shaping molds and a center of the rotation assembly is larger than a distance between an internal side of the opening and the center of the rotation assembly, the unused dough can easily drop into the opening, so as to be collected.

A sending and cutting part is set on a sending and cutting station. A stuffing injection part is set on a stuffing injection station. The sending and cutting part and the stuffing injection part adopt conventional structures. The sending and cutting station and stuffing injection station are set around the rotation assembly while other processing stations can be set inside a rotation disc or positions other than the rotation assembly.

Around the rotation assembly, the shaping station and the discharge station are arranged in sequence beside the stuffing injection station; a pressing and shaping part is provided on the shaping station, and a discharge part is provided on the discharge station. The pressing and shaping part and the discharge part can be conventional ones.

The structure of the rotation assembly is as follows.

The rotation assembly comprises the rotation disc; the shaping molds are evenly distributed on the rotation disc; the rotation disc has the opening for collecting the unused dough; wherein a distance between the internal side of the shaping molds and a center of the rotation disc is larger than a distance between the internal side of the opening and the center of the rotation disc. The opening is a through hole penetrating the rotation disc. When a distance between an internal side of the shaping molds and a center of the rotation assembly is larger than a distance between an internal side of the opening and the center of the rotation assembly, the unused dough can easily drop into the opening, so as to be collected.

A structure of the opening is continuously arranged on the rotation disc. Being continuously arranged means the opening is provided as a whole without break, which guarantees smooth collection of the unused dough while the rotation disc is rotating. The structure of the opening must be continuously arranged to collect the unused dough while the rotation disc is rotating.

The opening is a circular, which is set at the center of the rotation disc.

The opening is loop-shaped, which is set on the center or center-outward position of the rotation disc.

The opening penetrates an upper surface and a lower surface of the rotation disc.

Relative positions of the shaping molds and the opening are as follows.

Top surfaces of the shaping molds lie above the opening, and the shaping molds are arranged outside the opening.

Top surfaces of the shaping molds lie above the opening, and projection of the shaping modes in a vertical direction partially or completely falls within the structure of the opening.

Structure of a loop body of the rotation disc is as follows.

A shape of the rotation disc is a rectangle, a circle or an irregular shape.

A bottom of the rotation disc is connected to a rotation sleeve; the rotation sleeve is connected to a worm wheel; the worm wheel is connected to a worm screw; and the worm screw is connected to a motor.

Rails are settled as follows.

A base is arranged under the rotation disc; a guiding plate between the base and the rotation disc is a cylinder; a first guiding rail is provided on an external surface of the cylinder; wherein the first guiding rail matches a first roller of a catch plate on the shaping molds, so as to move the catch plate up and down.

The guiding plate is a continuous cylinder.

A disconnected portion is provided on a cylinder of the guiding plate; the disconnected portion is partly or entirely disconnected. The guiding plate is provided to stations where structures of the shaping molds move up and down. The guiding plate is not needed for stations where height will not be adjusted.

There is at least one disconnected portion.

A second guiding rail is provided on an edge of the base, wherein the second guiding rail matches a second roller of the molding cups on the shaping molds, so as to move the molding cups up and down.

The working principle of the rotation assembly is as follows.

The motor drives the rotation disc to rotate the shaping molds which is connected to the rotation disc; the unused dough after cutting enters the opening on the rotation disc, so as to be collected; a base and a guiding plate under the rotation disc is independent thereto, which are static during working; guiding rails are provided on both the base and the guiding plate; guiding rollers on the shaping molds are guided by the guiding rails to drive a catch plate and the molds to move up and down respectively.

The working principles of the guiding rails are as follows.

Specifically, the shaping molds are conventional. Each of the shaping molds comprises a catch plate and a molding cup settled in the catch plate; wherein a bottom of the catch plate is connected to a first roller through a first connecting rod, and a bottom of the molding cup is connected to a second roller through a second connecting rod; since the shaping molds rotates with the rotating disc while the guiding plate and the base remain still, the catch plate moves up and down along a wave-shaped track in the first guiding rail on the external surface of the guiding plate with the first roller; the second guiding rail cooperates with the second roller to move molding cups up and down; as a result, different parts of the shaping molds move up and down at different stations.

The structure of the sending and cutting part is as follows.

the sending and cutting part comprises a guiding pillar and a cylinder sleeve which is sleeved on the guiding pillar; the cylinder sleeve is connected to a cutter holding plate; a cutter is mounted at a bottom of the cutter holding plate; the cutter holding plate is connected to an eccentric wheel through a connecting rod; a motor drives the eccentric wheel directly; a cutting plate is arranged under the cutter, and a cutter hole is set on the cutting plate corresponding to the cutter. The cutter hole cooperates with the cutter to cut the dough wrappers.

The forming machine further comprises two dough wrapper supporters which are laterally arranged, wherein two dough feeding rollers are placed on the two dough wrapper supporters in sequence, and multiple auxiliary rollers are arranged between the two dough feeding rollers; the cutting plate is mounted between the auxiliary rollers. The present invention does not require a conveyor belt which is essential to the conventional machines.

A supporting pillar is provided on an external side of each of the dough wrapper supporters; the guiding pillar is on a top of the supporting pillar.

Grooves for containing dough belt rollers are provided on external ends of the two dough wrapper supporters. The dough belt is wound to rolls by the dough belt rollers which are placed in the grooves.

A driven roller is set above the dough feeding rollers.

The dough feeding rollers are driven directly by the motor.

The two dough feeding rollers are connected by a drive belt, so as to roll synchronized.

The working principle of the sending and cutting dough wrapper is as follows.

The dough wrappers are driven by the dough feeding rollers and move toward the cutter; when the dough wrappers are under the cutter, the motor drives the eccentric wheel to rotate, in such a manner that the connecting rod rotates with the eccentric wheel; the cutter holding plate is connected to and driven by the connecting rod and the cylinder sleeve to move up and down along the guiding pillar; and the cutter moves up and down with the cutter holding plate and cooperates with the cutter hole on the cutting plate, so as to cut the dough wrapper.

The structure of the stuffing injection part is as follows.

The stuffing injection part comprises a supporting frame, a hopper and a rotating base which are both arranged on the supporting frame; a rotating valve is provided inside the rotating base; the hopper is connected to a top of rotating base through a stuffing inlet pipe, and a stuffing outlet pipe is arranged below the rotating base; a transverse injecting tube is on a side of the rotating base, and a transverse injecting rod is provided inside the transverse injecting tube, and a longitude injecting tube is provided at an outlet of the stuffing outlet pipe; the longitude injecting tube is driven by a gear rack driving mechanism to move up and down; the transverse injecting rod is driven by an eccentric wheel driving mechanism to move horizontally; a screw conveyor inside the hopper is driven by a worm driving mechanism to rotate; and the rotating valve is driven directly by a motor to rotate.

A longitude injecting rod is provided inside the longitude injecting tube; the longitude injecting rod is driven by the gear rack driving mechanism to move up and down inside the longitude injecting tube. The injecting rods push the stuffing downwardly from the outlet of the stuffing outlet pipe.

The gear rack driving mechanism, the eccentric wheel driving mechanism and the worm driving mechanism are driven separately by different motors, which means each driving mechanism is driven by a different motor.

The gear rack driving mechanism is inside the supporting frame.

An L-shaped tunnel is provided inside the rotating valve.

The working principle of the stuffing injection part is as follows.

The motor drives a worm screw wheel to rotate, and the worm screw wheel drives the screw conveyor inside the hopper to stir stuffing; the stuffing is conveyed to the rotating valve after being stirred by the screw conveyor; the motor drives the rotating valve to rotate by 90 degrees counter-clockwise after the rotating valve is filled with the stuffing; then the motor drives the eccentric wheel driving mechanism to drive the transverse injecting rod to move horizontally, so as to push the stuffing out from a bottom of the rotating valve and move the stuffing to an outlet of the stuffing outlet pipe; the motor drives the gear rack driving mechanism, and the gear rack driving mechanism drives the longitude injecting rod to move up and down to discharge the stuffing from the outlet of the stuffing outlet pipe; meanwhile, the motor drives the gear rack driving mechanism, and the gear rack driving mechanism drives the longitude injecting tube to move down to push the stuffing into the dough wrappers.

The structure of the pressing and shaping part is as follows.

The pressing and shaping part comprises a supporting pillar and a pair of pressing molds which are fixed on the supporting pillar; a gear is provided on a top of each of the pressing molds; pressing blocks are provided on bottoms of the pressing molds; gears of the pressing molds are engaged with each other; the pressing blocks of the pressing molds are opposite to each other; a top of at least one of the pressing molds is connected to a motor.

Pressing surfaces of the pressing blocks are curved.

One of the pressing blocks is laterally concave while the other of the pressing blocks is laterally convex.

The gear is provided on each of the semicircle rotating plates; and curved surfaces of the two rotating plates are opposite to each other.

The working principle of the pressing and shaping part is as follows.

The motor drives the top of one of the pressing molds to rotate; since the gear on the top of each of the pressing molds is engaged with each other, the top of the other of the pressing molds is driven to rotate, in such a manner that the pressing blocks below press each other; the pressing surfaces of the pressing blocks are curved, so as to form wave shapes at sealed edges of the dough wrappers when pressing.

A method for shaping the stuffed food comprises following steps of:

step 1: starting a sending motor to send the dough belt; starting a stirring motor to continuously stir the stuffing;

step 2: starting a sucking and pushing motor to suck material when the dough belt is moved forward by the sending motor with a dumpling wrapper's length;

step 3: starting a cutter to cut the dough belt, and rotating a rotating valve with a rotating valve motor by 90 degrees counter-clockwise;

step 4: starting the sucking and pushing motor again to push the material; and rotating a rotation disc with a rotation disc motor by 90 degrees;

step 5: resetting the rotating valve with the rotating valve motor; starting an external cylinder motor and an internal cylinder motor to respectively move an external cylinder and an internal cylinder downwardly, so as to push the stuffing into the dough wrappers;

step 6: after pushing the stuffing into the dough wrappers, resetting the external cylinder motor and the internal cylinder motor;

step 7: rotating the rotation disc with the rotation disc motor by 90 degrees;

step 8: using a pressing motor to press and fold the dumplings for a while before releasing;

step 9: rotating the rotation disc with the rotation disc motor by 90 degrees;

step 10: moving the dumplings to a discharge station by a discharge motor, staring a clamping motor to clamp;

step 11: resetting the discharge motor and the clamping motor, and storing the dumplings;

step 12: rotating the rotation disc with the rotation disc motor by 90 degrees, so as to finish a whole process; and step 13: backing to the step 1, and repeating.

The sending motor drives the dough feeding rollers of the sending and cutting part.

The stirring motor drives the screw conveyor inside the hopper of the stuffing injection part.

The sucking and pushing motor drives the transverse injecting rod of the stuffing injection part to move horizontally.

The cutting motor drives the cutter of the sending and cutting part to move up and down, so as to cut the dough wrappers.

The rotating valve motor drives the rotating valve of the stuffing injection part to rotate.

The rotation disc motor drives the rotation disc of the rotation assembly to rotate.

The external cylinder motor drives the longitude injecting tube of the stuffing injection part to move up and down.

The internal motor drives the longitude injecting rod of the stuffing injection part to move up and down.

The pressing motor drives the pressing mold of the pressing and shaping part to press and release.

The discharge motor drives a clamping structure of the discharge part to move.

The clamping motor drives the clamping structure of the discharge part to clamp and release.

The above-mentioned motors are servo motors.

The benefits of the present invention are as follows.

1. According to the present invention, the opening on the rotation assembly collects the unused dough and takes full advantage of the space below the rotation assembly. A recycling bin is placed below the opening to collect the unused dough, or a processing mechanism is settled below the opening to process the unused dough for reuse. The recycling bin or the processing mechanism does not increase the size of the machine and requires no extra space. The size of present invention is compact and is able to be further reduced, which is suitable for family, canteen or small shop.

2. The present invention replaces the conventional complicated driving mechanism driven by a single motor with separate motors for different parts. The improvement simplifies the driving mechanism and further reduces the space occupied by the conventional driving mechanism. As a result, the size of the present invention is further reduced. The size of the unused dough collecting mechanism is able to be enlarged accordingly for better performances.

3. According to the present invention, the opening is able to be in any shape, as long as it is convenient for collection of the unused dough. When the distance between an internal side of the shaping molds and a center of the rotation assembly is larger than the distance between an internal side of the opening and the center of the rotation assembly, no matter the shaping molds are arranged outside the opening or projection of the shaping modes in a vertical direction partially or completely falls within the structure of the opening, the unused dough is able to conveniently fall into the opening without guiding.

4. The present invention adopts worm screw and worm wheel to drive the rotation sleeve and the rotation disc. The separate driving structure replaces the complicated cam mechanism and solves the problem of redundant driving structures required by a single motor. More space is able to be used for collection and processing of the unused dough.

5. The guiding plate cooperates with the base to move the catch plate and molding cups up and down between different positions. Disconnected portions may be provided on both the first guiding rail on the guiding plate and the second guiding rail on the base, which means the first and second guiding rails are only applied to stations whose structure height needs to be adjusted. Non-continuously arranged guiding rails reduce cost in material and are simple in structure.

6. Compared to conventional machines, the sending and cutting part of the present invention omits an internal pushing device inside the cutter, a conveyor belt and a scraper. The eccentric wheel structure drives the cutter to cut the dough wrappers, which is steadier. The structure is also simplified to save space.

7. The dough feeding rollers cooperates with the auxiliary rollers to transport the dough belt without the conveyor belt. Furthermore, with the driven roller above the dough feeding rollers, more frictions are provided to the dough belt, thereby smoothly moving of the dough belt and avoiding sliding.

8. Each part of the present invention is driven by an individual driving mechanism and an individual motor, which avoids complicated linkage structures, simplifies the whole structure and reduces the size of the machine. The gear rack driving mechanism, the eccentric wheel driving mechanism and the worm driving mechanism provide smooth transmission to connected structures, which improves stability.

9. The pressing molds of the present invention adopt engaged gears to pressing dough wrapper edges from above. The present invention improves the conventional structures and prevents squeeze on other part of the dumplings due to the conventional horizontal pressing or pressing from below, so as to maintain appearance of the dumplings. The motor drives the pressing molds to rotate directly, which simplifies the structure and ensures the forming results.

10. The present invention has fewer controlling points, low failure rate, and low maintenance and use costs.

Figure 1:
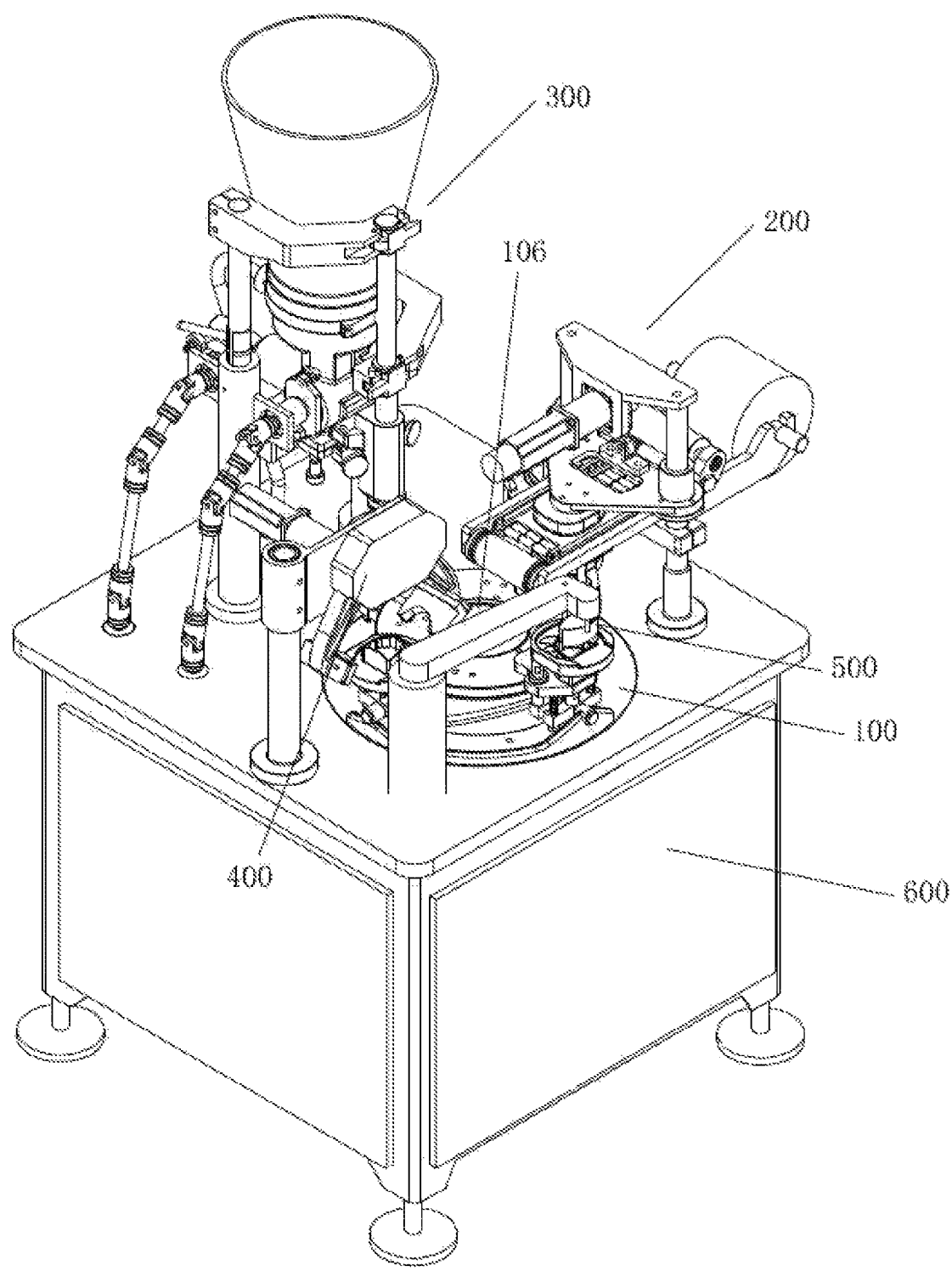
FIG. 1 is a perspective view of a whole forming machine for stuffed food.
Figure 2:
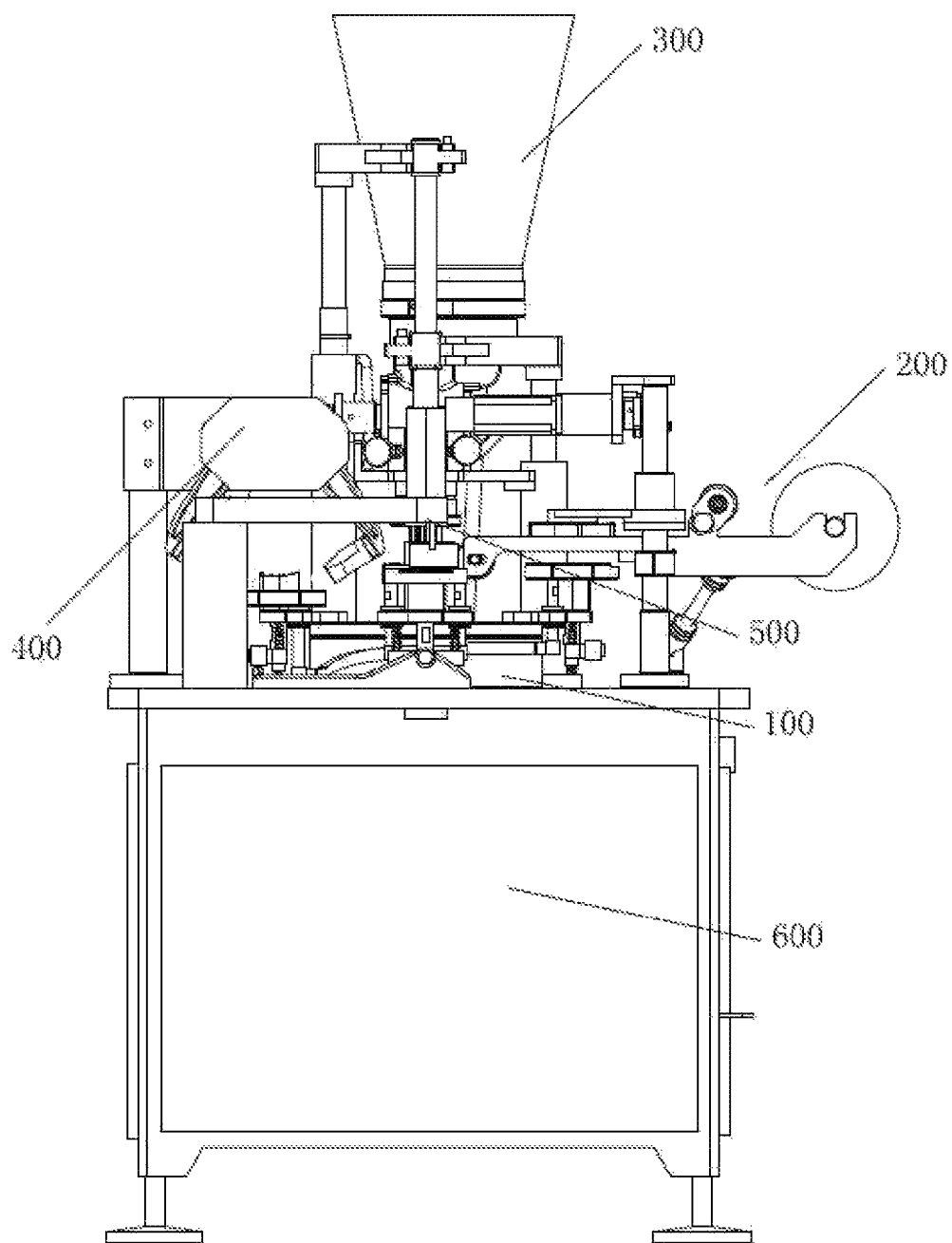
FIG. 2 is a side view of the whole forming machine for the stuffed food.
Figure 3:
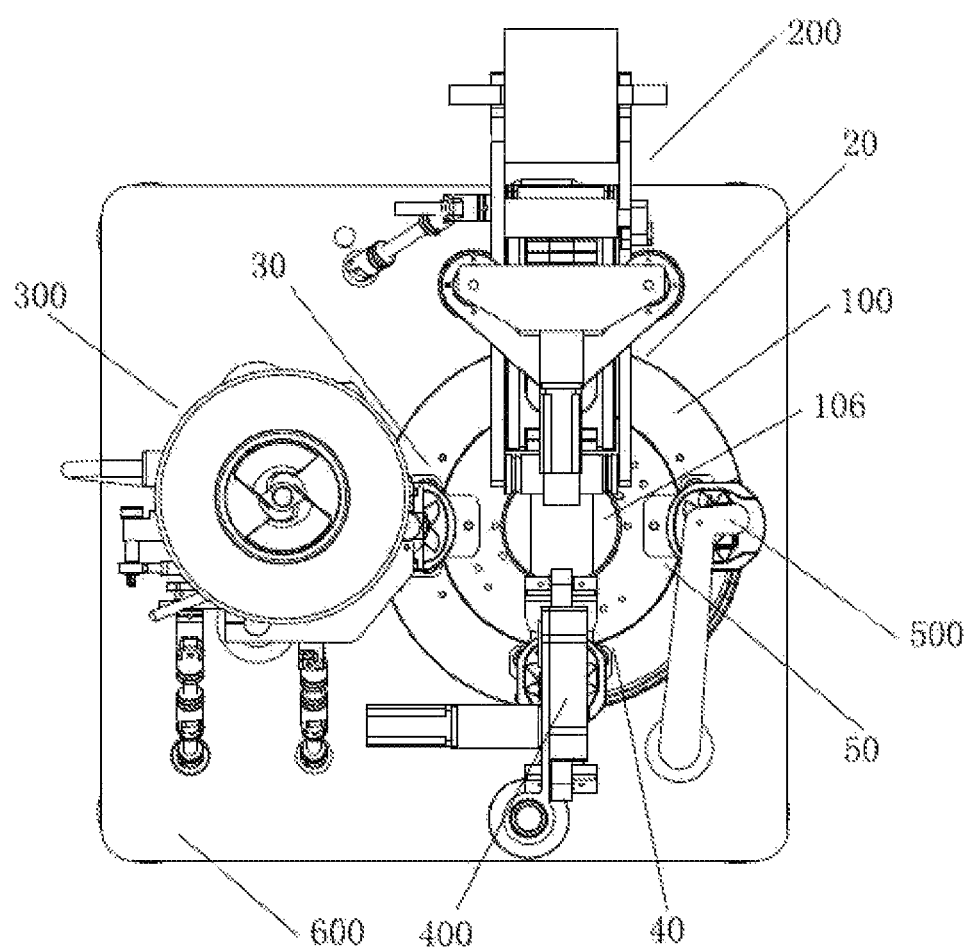
FIG. 3 is a top view of the whole forming machine for the stuffed food.
Figure 4:
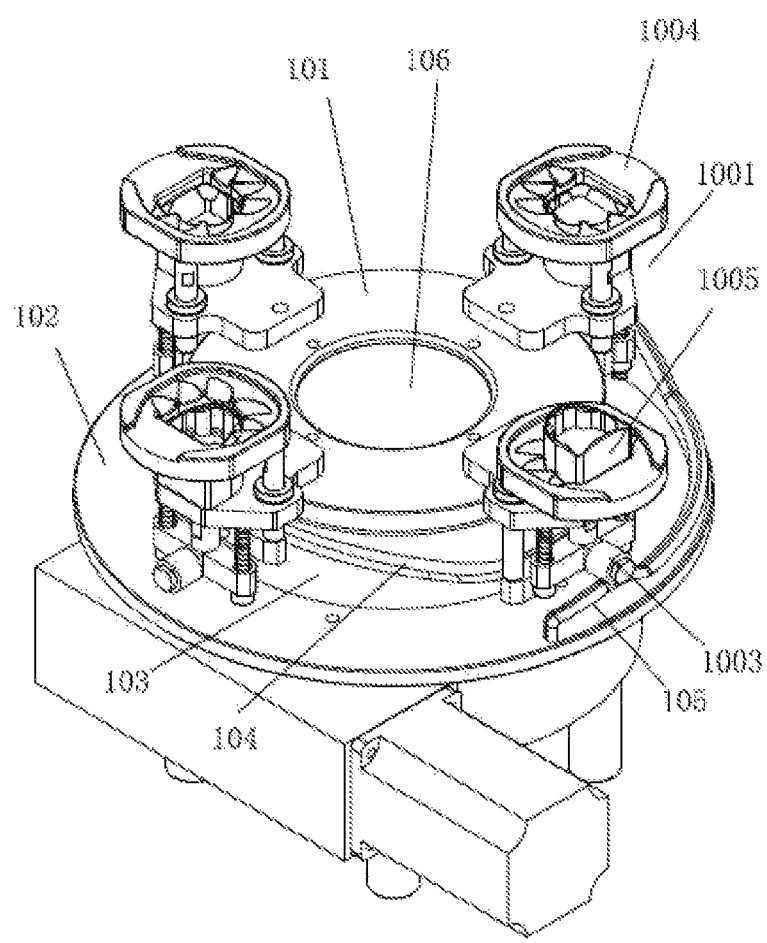
FIG. 4 is a perspective view of a rotation assembly.
Figure 5:
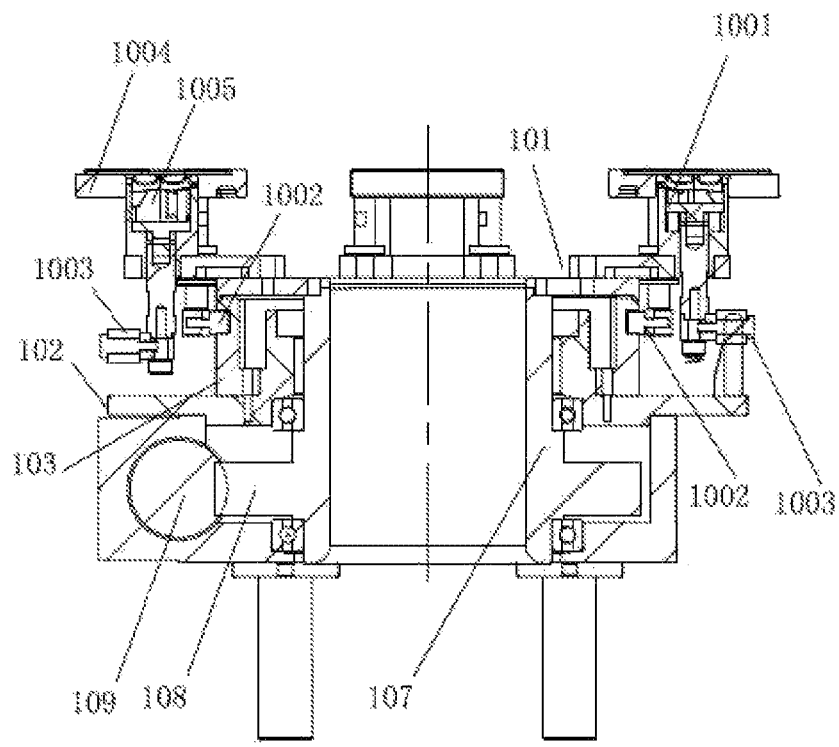
FIG. 5 is a sectional view of the rotation assembly.
Figure 6:
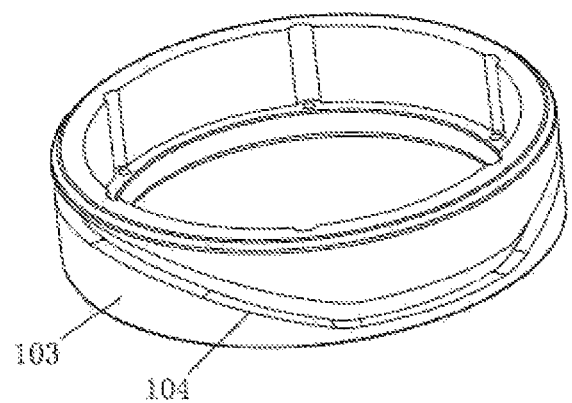
FIG. 6 is a perspective view of a guiding plate and a first guiding rail.
Figure 7:
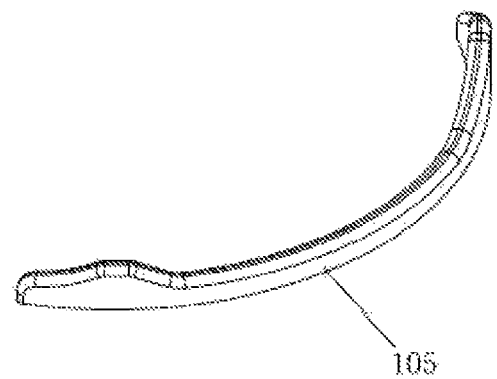
FIG. 7 is a perspective view of a second guiding rail on a base.
Figure 8:
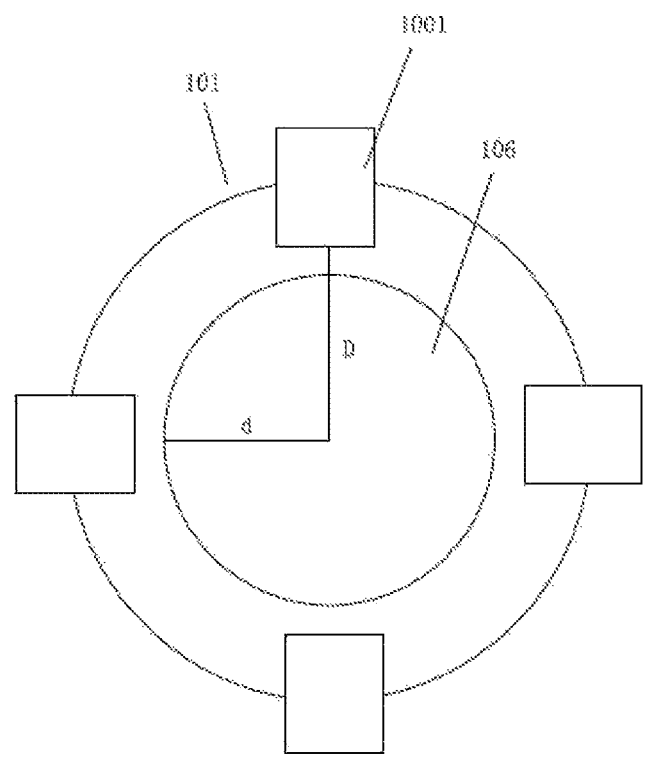
FIG. 8 illustrates that a distance D between an internal side of the shaping molds and a center of the rotation assembly is larger than a distance d between an internal side of the opening and the center of the rotation assembly.
Figure 9:
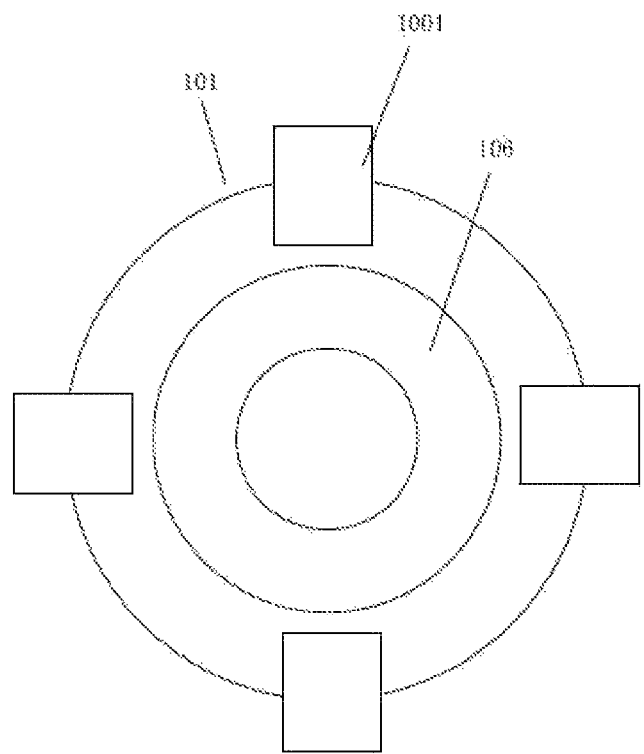
FIG. 9 is a perspective view of a loop-shaped opening.
Figure 10:
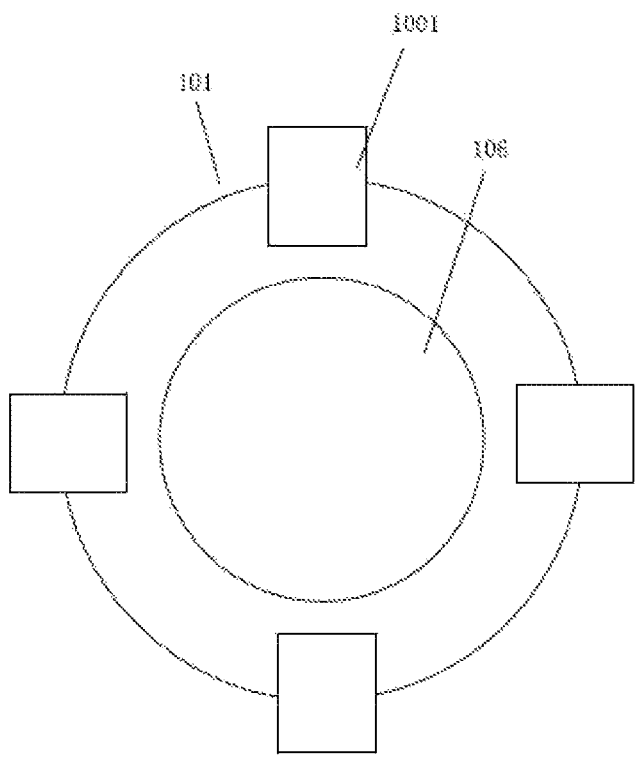
FIG. 10 illustrates that the shaping molds are arranged outside the opening.
Figure 11:
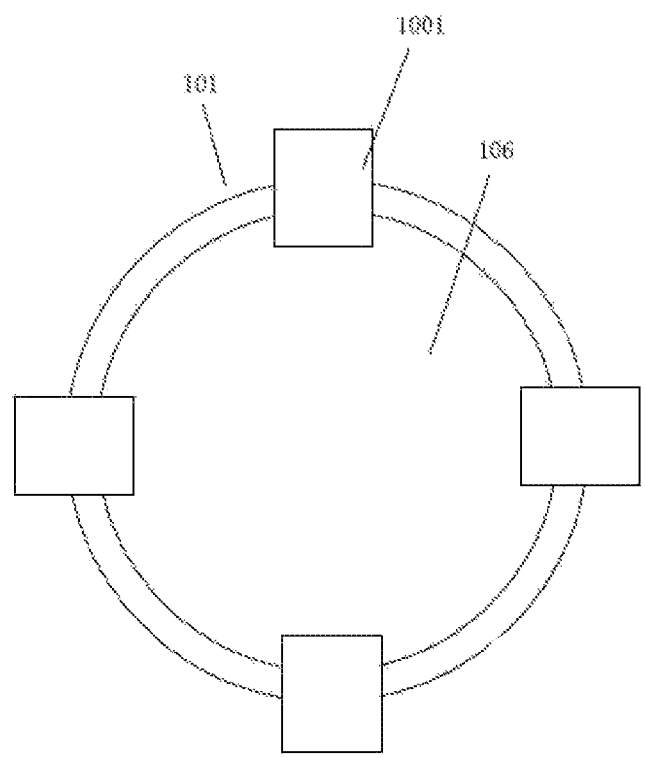
FIG. 11 illustrates that projection of the shaping modes in a vertical direction partially or completely falls within the opening.
Figure 12:
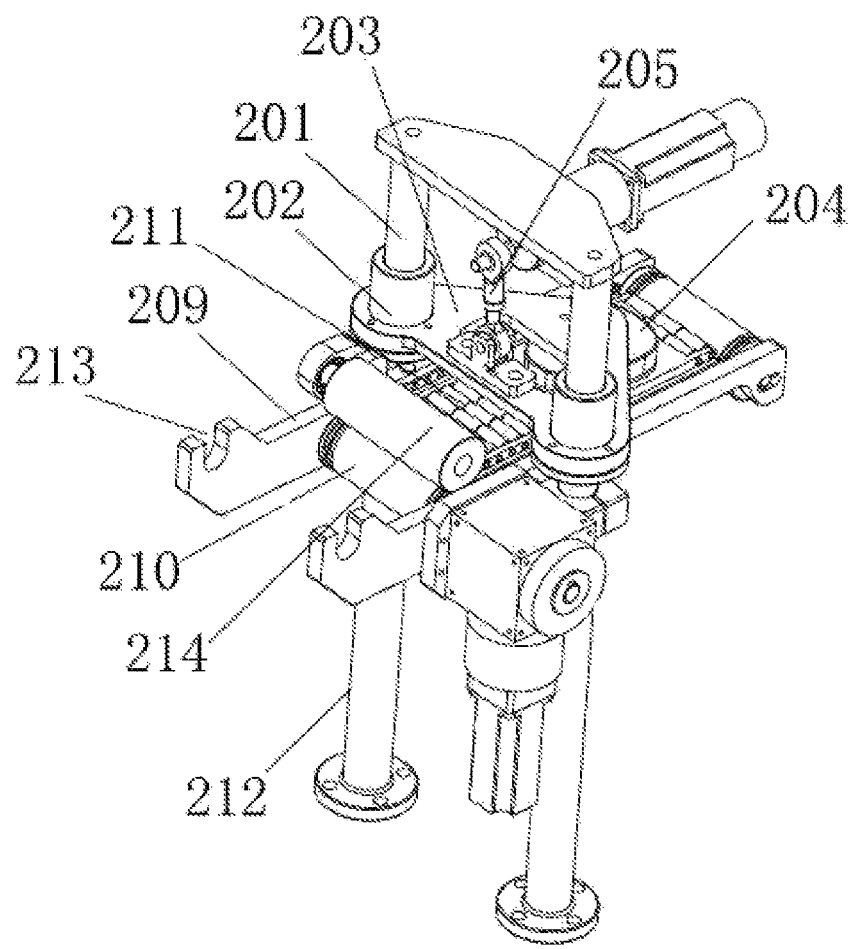
FIG. 12 is a perspective view of a sending and cutting part.
Figure 13:
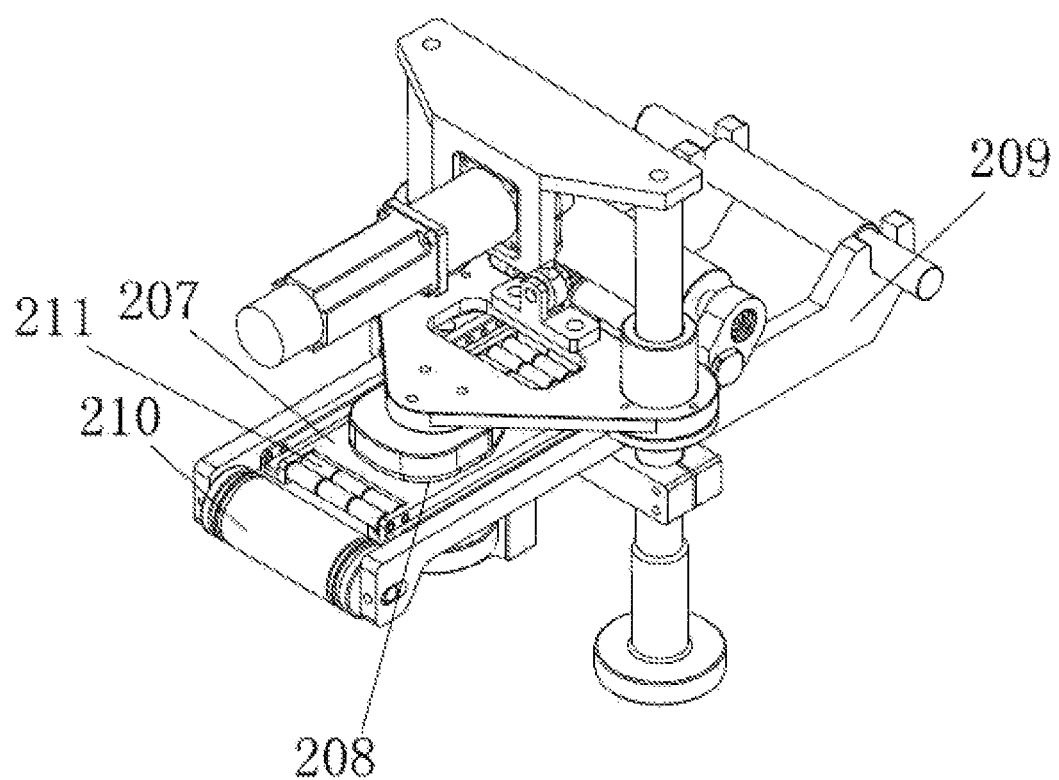
FIG. 13 is a perspective view of the sending and cutting part with dough feeding rollers.
Figure 14:
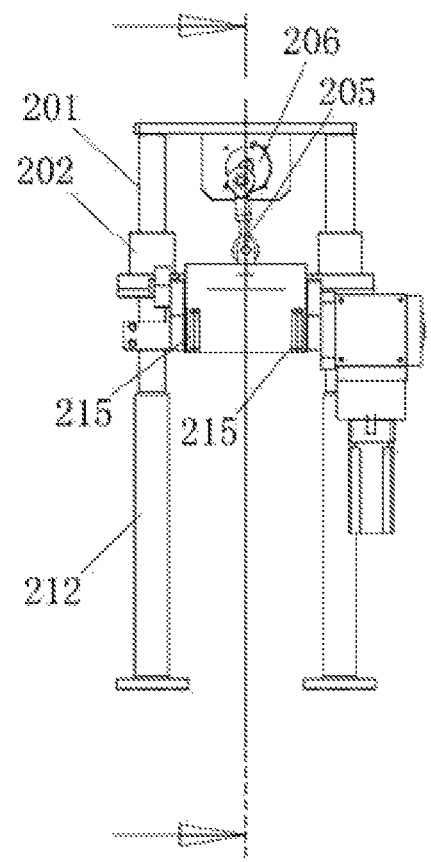
FIG. 14 is a side view of the sending and cutting part.
Figure 15:
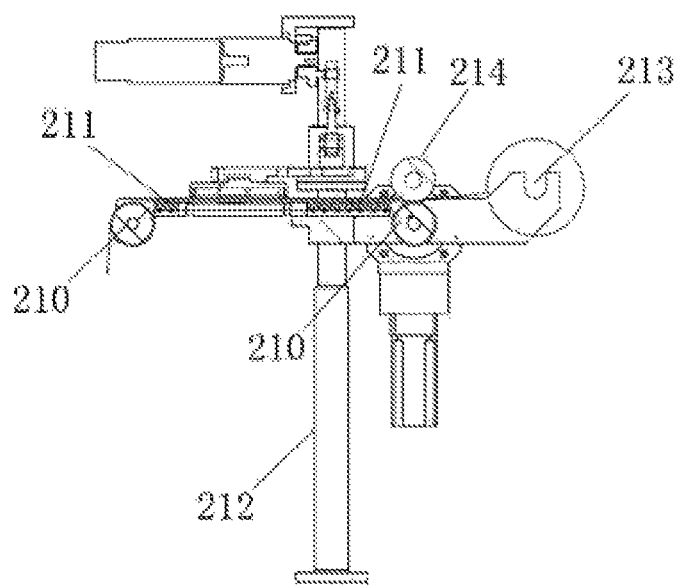
FIG. 15 is a sectional view of the sending and cutting part.
Figure 16:
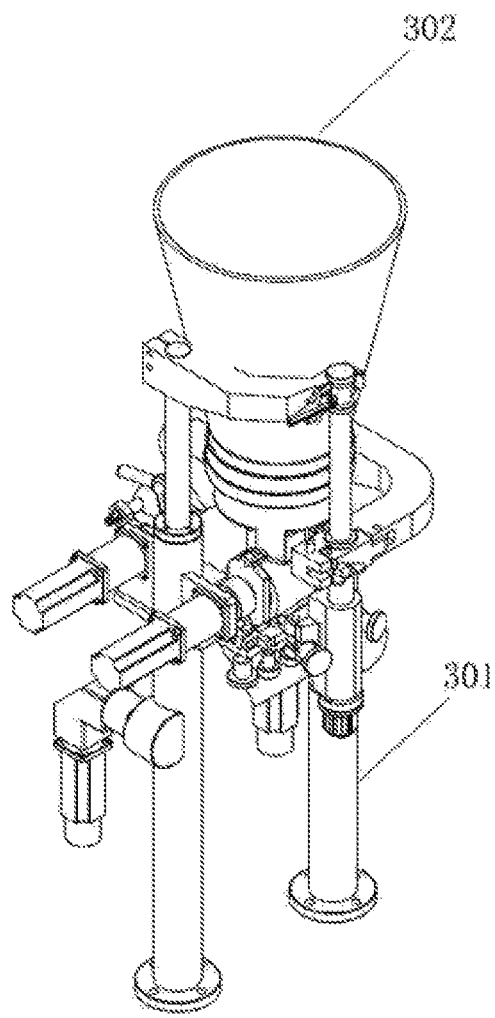
FIG. 16 is a perspective view of a stuffing injection part.
Figure 17:
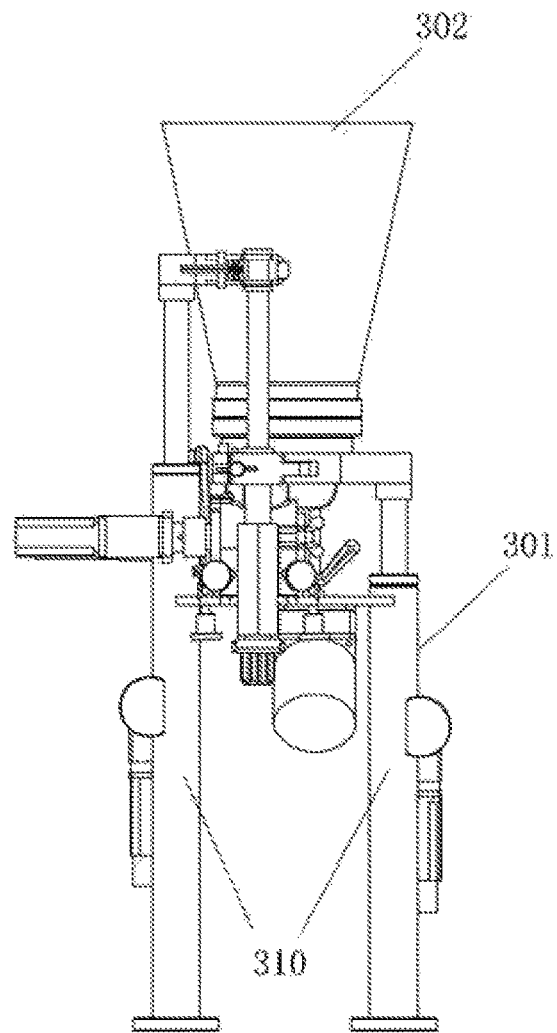
FIG. 17 is a front view of the stuffing injection part.
Figure 18:
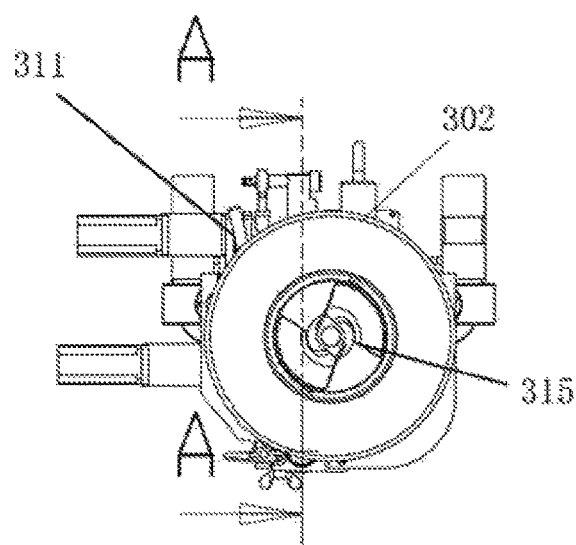
FIG. 18 is a top view of the stuffing injection part.
Figure 19:
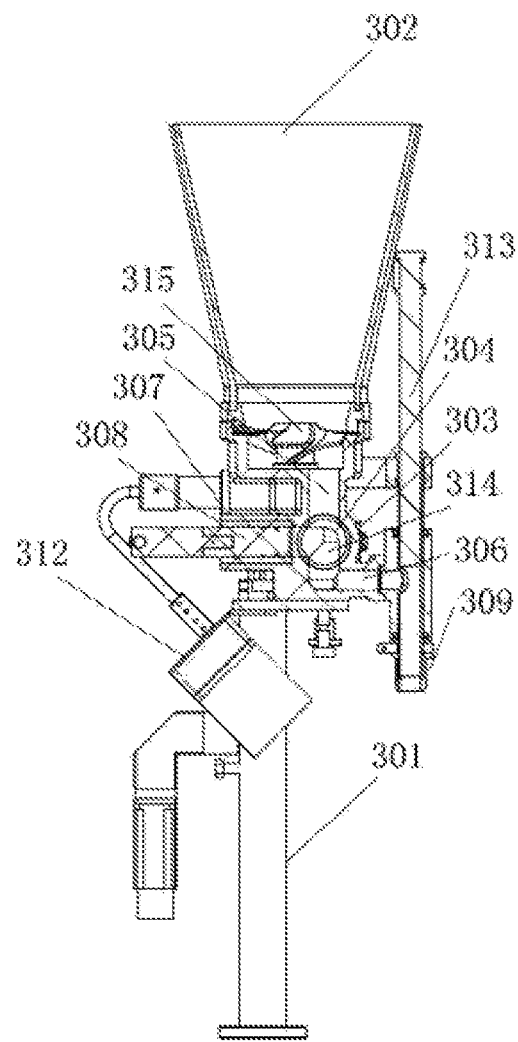
FIG. 19 is a sectional view of the stuffing injection part.
Figure 20:
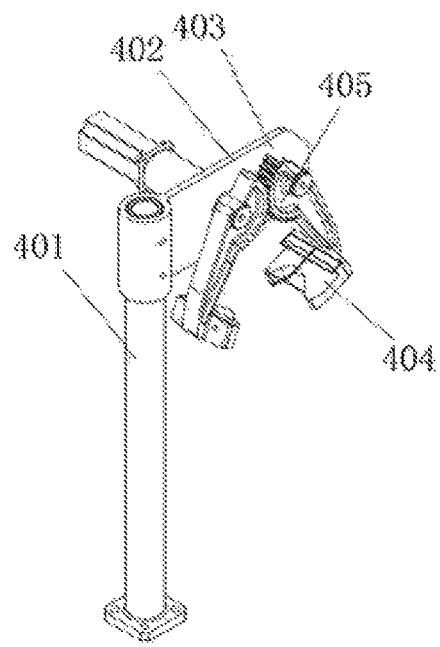
FIG. 20 is a perspective view of a pressing and shaping part.
Figure 21:
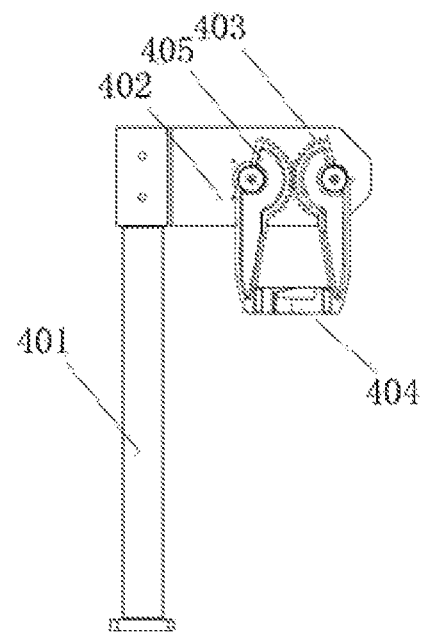
FIG. 21 is a front view of the pressing and shaping part.

ELEMENT REFERENCE sending and cutting station 20, stuffing injection station 30, shaping station 40, discharge station 50, rotation assembly 100, sending and cutting part 200, stuffing injection part 300, pressing and shaping part 400, discharge part 500, framework 600,
rotation disc 101, base 102, guiding plate 103, first guiding rail 104, second guiding rail 105, opening 106, rotation sleeve 107, worm wheel 108, worm screw 109, shaping mold 1001, first roller 1002, second roller 1003, catch plate 1004, molding cup 1005,
guiding pillar 201, cylinder sleeve 202, cutter holding plate 203, cutter 204, connecting rod 205, eccentric wheel 206, cutting plate 207, cutter hole 208, dough wrapper supporter 209, dough feeding roller 210, auxiliary roller 211, supporting pillar 212, groove 213, driven roller 214, drive belt 215,
supporting frame 301, hopper 302, rotating base 303, rotating valve 304, stuffing inlet pipe 305, stuffing outlet pipe 306, transverse injecting tube 307, transverse injecting rod 308, longitude injecting tube 309, gear rack driving mechanism 310, eccentric wheel driving mechanism 311, worm driving mechanism 312, longitude injecting rod 313, L-shaped tunnel 314, screw conveyor 315, supporting pillar 401, pressing mold 402, gear 403, pressing block 404, rotating plate 405.

DETAILED DESCRIPTION OF THE PREFERRED EMBODIMENT

Embodiment 1

A method for forming stuffed food is provided, comprising steps of:
step 1: sending and cutting dough wrappers; wherein shaping molds 1001 on a rotation disc 101 are arranged below a sending and cutting station 20; the dough wrappers are cut into pre-set shapes before dropping in the shaping molds 1001; unused dough enters an opening 106 on the rotation disc 101 and is transported downwardly, so as to be collected; and
step 2: filling the dough wrappers with stuffing; wherein the shaping molds 1001 transport the dough wrappers to a stuffing injection station 30 where the stuffing is injected onto the dough wrappers.

Embodiment 2

A method for forming stuffed food is provided, comprising steps of:
step 1: sending and cutting dough wrappers; wherein shaping molds 1001 on a rotation disc 101 are arranged below a sending and cutting station 20; the dough wrappers are cut into pre-set shapes before dropping in the shaping molds 1001; unused dough enters an opening 106 on the rotation disc 101 and is transported downwardly, so as to be collected; and
step 2: filling the dough wrappers with stuffing; wherein the shaping molds 1001 transport the dough wrappers to a stuffing injection station 30 where the stuffing is injected onto the dough wrappers.
The method further comprises steps of:
step 3: pressing and shaping; wherein the shaping molds 1001 are transported by the rotation disc 101 to a shaping station 40 where the dough wrappers are pressed and shaped; and
step 4: outputting final products; wherein the shaping molds 1001 are transported to a discharge station 50, so as to output the final products.

Embodiment 3

A method for forming stuffed food is provided, comprising steps of:
step 1: sending and cutting dough wrappers; wherein shaping molds 1001 on a rotation disc 101 are arranged below a sending and cutting station 20; the dough wrappers are cut into pre-set shapes before dropping in the shaping molds 1001; unused dough enters an opening 106 on the rotation disc 101 and is transported downwardly, so as to be collected; and
step 2: filling the dough wrappers with stuffing; wherein the shaping molds 1001 transport the dough wrappers to a stuffing injection station 30 where the stuffing is injected onto the dough wrappers.
The method further comprises steps of:
step 3: pressing and shaping; wherein the shaping molds 1001 are transported by the rotation disc 101 to a shaping station 40 where the dough wrappers are pressed and shaped; and
step 4: outputting final products; wherein the shaping molds 1001 are transported to a discharge station 50, so as to output the final products.

To achieve the above method, the present invention provides a forming machine for the stuffed food, which comprises a framework and a rotation assembly on the framework; wherein at least the sending and cutting station 20 and the stuffing injection station 30 are arranged around the rotation assembly 100; the rotation assembly 100 has the opening 106 for collecting the unused dough from the sending and cutting station 20; a distance between an internal side of the shaping molds 1001 and a center of the rotation assembly 100 is larger than a distance between an internal side of the opening 106 and the center of the rotation assembly 100. The stuffed food processed in the present invention comprises all kinds of stuffed foods such as dumplings, Tang-yuan, buns and Shao-mai. Taking the process of making dumpling as an example, the dough wrappers before the cutting process is called a dumpling dough belt, and wrappers obtained according to a shape of the cutter after the cutting process is called dough wrappers. During the cutting process, the remaining dough is called unused dough. When a distance between an internal side of the shaping molds 1001 and a center of the rotation assembly 100 is larger than a distance between an internal side of the opening 106 and the center of the rotation assembly 100, the unused dough can easily drop into the opening 106, so as to be collected.

A sending and cutting part 200 is set on a sending and cutting station 20. A stuffing injection part 300 is set on a stuffing injection station 30. The sending and cutting part 200 and the stuffing injection part 300 adopt conventional structures. The sending and cutting station 20 and stuffing injection station 30 are set around the rotation assembly 100 while other processing stations can be set inside a rotation disc or positions other than the rotation assembly.

Around the rotation assembly 100, the shaping station 40 and the discharge station 50 are arranged in sequence beside the stuffing injection station 30; a pressing and shaping part 400 is provided on the shaping station 40, and a discharge part 500 is provided on the discharge station 50. The pressing and shaping part 400 and the discharge part 500 can be conventional ones.

According to the present invention, the opening 106 on the rotation assembly 100 collects the unused dough and takes full advantage of the space below the rotation assembly 100. A recycling bin is placed below the opening 100 to collect the unused dough, or a processing mechanism is settled below the opening 100 to process the unused dough for reuse. The recycling bin or the processing mechanism does not increase the size of the machine and requires no extra space.

The present invention replaces the conventional complicated driving mechanism driven by a single motor with separate motors for different parts. The improvement simplifies the driving mechanism and further reduces the space occupied by the conventional driving mechanism. As a result, the size of the present invention is further reduced. The size of the unused dough collecting mechanism is able to be enlarged accordingly for better performances.

The rotation assembly 100 comprises the rotation disc 101; the shaping molds 1001 are evenly distributed on the rotation disc 101; the rotation disc 101 has the opening 106 for collecting the unused dough; wherein a distance between the internal side of the shaping molds 1001 and a center of the rotation disc 101 is larger than a distance between the internal side of the opening 106 and the center of the rotation disc 101. The opening 106 is a through hole penetrating the rotation disc 101. When a distance between an internal side of the shaping molds 1001 and a center of the rotation assembly 100 is larger than a distance between an internal side of the opening 106 and the center of the rotation assembly 100, the unused dough can easily drop into the opening 106, so as to be collected.

A structure of the opening 106 is continuously arranged on the rotation disc 101. Being continuously arranged means the opening 106 is provided as a whole without break, which guarantees smooth collection of the unused dough while the rotation disc 101 is rotating. The structure of the opening 106 must be continuously arranged to collect the unused dough while the rotation disc 101 is rotating.

The opening 106 is a circular, which is set at the center of the rotation disc 101.

The opening 106 is loop-shaped, which is set on the center or center-outward position of the rotation disc 101.

The opening 106 penetrates an upper surface and a lower surface of the rotation disc 101.

Relative positions of the shaping molds 1001 and the opening 106 are as follows.

Top surfaces of the shaping molds 1001 lie above the opening 106, and the shaping molds 1001 are arranged outside the opening 106.

Top surfaces of the shaping molds 1001 lie above the opening 106, and projection of the shaping modes 1001 in a vertical direction partially or completely falls within the structure of the opening 106.

Structure of a loop body of the rotation disc 101 is as follows.

A shape of the rotation disc 101 is a rectangle, a circle or an irregular shape.

A bottom of the rotation disc 101 is connected to a rotation sleeve 107; the rotation sleeve 107 is connected to a worm wheel 108; the worm wheel 108 is connected to a worm screw 109; and the worm screw 109 is connected to a motor.

A base 102 is arranged under the rotation disc 101; a guiding plate 103 between the base 102 and the rotation disc 101 is a cylinder; a first guiding rail 104 is provided on an external surface of the cylinder; wherein the first guiding rail 104 matches a first roller 1002 of a catch plate 1004 on the shaping molds 1001, so as to move the catch plate 1004 up and down.

The guiding plate 103 is a continuous cylinder.

A disconnected portion is provided on a cylinder of the guiding plate 103; the disconnected portion is partly or entirely disconnected. The guiding plate 103 is provided to stations where structures of the shaping molds 1001 move up and down. The guiding plate 103 is not needed for stations where height will not be adjusted.

There is at least one disconnected portion.

A second guiding rail 105 is provided on an edge of the base 102, wherein the second guiding rail 105 matches a second roller 1003 of the molding cups 1005 on the shaping molds 1001, so as to move the molding cups 1005 up and down.

The motor drives the rotation disc 101 to rotate the shaping molds 1001 which is connected to the rotation disc 101; the unused dough after cutting enters the opening 106 on the rotation disc 101, so as to be collected; a base 102 and a guiding plate 103 under the rotation disc 101 is independent thereto, which are static during working; guiding rails are provided on both the base 102 and the guiding plate 103; guiding rollers on the shaping molds 1001 are guided by the guiding rails to drive the catch plate 1004 and the molds to move up and down respectively.

According to the present invention, the opening 106 is able to be in any shape, as long as it is convenient for collection of the unused dough. When the distance between an internal side of the shaping molds 1001 and a center of the rotation assembly 100 is larger than the distance between an internal side of the opening 106 and the center of the rotation assembly 100, no matter the shaping molds are arranged outside the opening 106 or projection of the shaping modes 1001 in a vertical direction partially or completely falls within the structure of the opening 106, the unused dough is able to conveniently fall into the opening 106 without guiding.

4. The present invention adopts worm screw 109 and worm wheel 108 to drive the rotation sleeve 107 and the rotation disc 101. The separate driving structure replaces the complicated cam mechanism and solves the problem of redundant driving structures required by a single motor. More space is able to be used for collection and processing of the unused dough.

Specifically, the shaping molds 1001 are conventional. Each of the shaping molds 1001 comprises a catch plate 1004 and a molding cup 1005 settled in the catch plate 1004; wherein a bottom of the catch plate 1004 is connected to a first roller 1002 through a first connecting rod, and a bottom of the molding cup 1005 is connected to a second roller 1003 through a second connecting rod; since the shaping molds 1001 rotates with the rotating disc 101 while the guiding plate 103 and the base 102 remain still, the catch plate 1004 moves up and down along a wave-shaped track in the first guiding rail 104 on the external surface of the guiding plate 103 with the first roller 1002; the second guiding rail 105 cooperates with the second roller 1003 to move molding cups 1005 up and down; as a result, different parts of the shaping molds 1001 move up and down at different stations.

The guiding plate 103 cooperates with the base 102 to move the catch plate 1004 and molding cups 1005 up and down between different positions. Disconnected portions may be provided on both the first guiding rail 104 on the guiding plate 103 and the second guiding rail 105 on the base 102, which means the first guiding rail 104 and second guiding rail 105 are only applied to stations whose structure height needs to be adjusted. Non-continuously arranged guiding rails reduce cost in material and are simple in structure.

The sending and cutting part 200 comprises a guiding pillar 201 and a cylinder sleeve 202 which is sleeved on the guiding pillar 201; the cylinder sleeve 202 is connected to a cutter holding plate 203; a cutter 204 is mounted at a bottom of the cutter holding plate 203; the cutter holding plate 203 is connected to an eccentric wheel 206 through a connecting rod 205; a motor drives the eccentric wheel 206 directly; a cutting plate 207 is arranged under the cutter 204, and a cutter hole 208 is set on the cutting plate 207 corresponding to the cutter 204. The cutter hole 208 cooperates with the cutter 204 to cut the dough wrappers.

The forming machine further comprises two dough wrapper supporters 209 which are laterally arranged, wherein two dough feeding rollers 210 are placed on the two dough wrapper supporters 209 in sequence, and multiple auxiliary rollers 211 are arranged between the two dough feeding rollers 210; the cutting plate 207 is mounted between the auxiliary rollers 211. The present invention does not require a conveyor belt which is essential to the conventional machines.

A supporting pillar 212 is provided on an external side of each of the dough wrapper supporters 209; the guiding pillar 201 is on a top of the supporting pillar 212.

Grooves 213 for containing dough belt rollers are provided on external ends of the two dough wrapper supporters 209. The dough belt is wound to rolls by the dough belt rollers which are placed in the grooves 213.

A driven roller 214 is set above the dough feeding rollers 210.

The dough feeding rollers 210 are driven directly by the motor.

The two dough feeding rollers 210 are connected by a drive belt 215, so as to roll synchronized.

The dough wrappers are driven by the dough feeding rollers 210 and move toward the cutter 204; when the dough wrappers are under the cutter 204, the motor drives the eccentric wheel 206 to rotate, in such a manner that the connecting rod 205 rotates with the eccentric wheel 206; the cutter holding plate 203 is connected to and driven by the connecting rod 205 and the cylinder sleeve 202 to move up and down along the guiding pillar 201; and the cutter 204 moves up and down with the cutter holding plate 203 and cooperates with the cutter hole 208 on the cutting plate 207, so as to cut the dough wrapper.

Compared to conventional machines, the sending and cutting part 200 of the present invention omits an internal pushing device inside the cutter 204, a conveyor belt and a scraper. The eccentric wheel structure drives the cutter 204 to cut the dough wrappers, which is steadier. The structure is also simplified to save space. The dough feeding rollers 210 cooperates with the auxiliary rollers 211 to transport the dough belt without the conveyor belt. Furthermore, with the driven roller 214 above the dough feeding rollers 210, more frictions are provided to the dough belt, thereby smoothly moving of the dough belt and avoiding sliding.

The stuffing injection part 300 comprises a supporting frame 301, a hopper 302 and a rotating base 303 which are both arranged on the supporting frame; a rotating valve 304 is provided inside the rotating base 303; the hopper 302 is connected to a top of rotating base 303 through a stuffing inlet pipe 305, and a stuffing outlet pipe 306 is arranged below the rotating base 303; a transverse injecting tube 307 is on a side of the rotating base 303, and a transverse injecting rod 308 is provided inside the transverse injecting tube 307, and a longitude injecting tube 309 is provided at an outlet of the stuffing outlet pipe 306; the longitude injecting tube 309 is driven by a gear rack driving mechanism 310 to move up and down; the transverse injecting rod 308 is driven by an eccentric wheel driving mechanism 311 to move horizontally; a screw conveyor 315 inside the hopper 302 is driven by a worm driving mechanism 312 to rotate; and the rotating valve 304 is driven directly by a motor to rotate.

A longitude injecting rod 313 is provided inside the longitude injecting tube 309; the longitude injecting rod 313 is driven by the gear rack driving mechanism 310 to move up and down inside the longitude injecting tube 309. The injecting rods push the stuffing downwardly from the outlet of the stuffing outlet pipe 306.

The gear rack driving mechanism 310, the eccentric wheel driving mechanism 311 and the worm driving mechanism 312 are driven separately by different motors, which means each driving mechanism is driven by a different motor.

The gear rack driving mechanism 310 is inside the supporting frame 301.

An L-shaped tunnel 314 is provided inside the rotating valve 304.

The motor drives a worm screw wheel to rotate, and the worm screw wheel drives the screw conveyor 315 inside the hopper 302 to stir stuffing; the stuffing is conveyed to the rotating valve 304 after being stirred by the screw conveyor 315; the motor drives the rotating valve 304 to rotate by 90 degrees counter-clockwise after the rotating valve 304 is filled with the stuffing; then the motor drives the eccentric wheel driving mechanism 311 to drive the transverse injecting rod 308 to move horizontally, so as to push the stuffing out from a bottom of the rotating valve 304 and move the stuffing to an outlet of the stuffing outlet pipe 306; the motor drives the gear rack driving mechanism 310, and the gear rack driving mechanism 310 drives the longitude injecting rod 313 to move up and down to discharge the stuffing from the outlet of the stuffing outlet pipe 306; meanwhile, the motor drives the gear rack driving mechanism 310, and the gear rack driving mechanism 310 drives the longitude injecting tube 309 to move down to push the stuffing into the dough wrappers.

Each part of the present invention is driven by an individual driving mechanism and an individual motor, which avoids complicated linkage structures, simplifies the whole structure and reduces the size of the machine. The gear rack driving mechanism 310, the eccentric wheel driving mechanism 311 and the worm driving mechanism 312 provide smooth transmission to connected structures, which improves stability.

The pressing and shaping part 400 comprises a supporting pillar 401 and a pair of pressing molds 402 which are fixed on the supporting pillar 401; a gear 403 is provided on a top of each of the pressing molds 402; pressing blocks 404 are provided on bottoms of the pressing molds 402; gears 403 of the pressing molds 402 are engaged with each other; the pressing blocks 404 of the pressing molds 402 are opposite to each other; a top of at least one of the pressing molds 402 is connected to a motor.

Pressing surfaces of the pressing blocks 404 are curved.

One of the pressing blocks 404 is laterally concave while the other of the pressing blocks 404 is laterally convex.

The gear 403 is provided on each of the semicircle rotating plates 405; and curved surfaces of the two rotating plates 405 are opposite to each other.

The motor drives the top of one of the pressing molds 402 to rotate; since the gear 403 on the top of each of the pressing molds 402 is engaged with each other, the top of the other of the pressing molds 402 is driven to rotate, in such a manner that the pressing blocks 404 below press each other; the pressing surfaces of the pressing blocks 404 are curved, so as to form wave shapes at sealed edges of the dough wrappers when pressing.

The pressing molds 402 of the present invention adopt engaged gears 403 to pressing dough wrapper edges from above. The present invention improves the conventional structures and prevents squeeze on other part of the dumplings due to the conventional horizontal pressing or pressing from below, so as to maintain appearance of the dumplings. The motor drives the pressing molds 402 to rotate directly, which simplifies the structure and ensures the forming results.

A method for shaping the stuffed food comprises following steps of:

step 1: starting a sending motor to send the dough belt; starting a stirring motor to continuously stir the stuffing;
step 2: starting a sucking and pushing motor to suck material when the dough belt is moved forward by the sending motor with a dumpling wrapper's length;
step 3: starting a cutter to cut the dough belt, and rotating a rotating valve 304 with a rotating valve motor by 90 degrees counter-clockwise;
step 4: starting the sucking and pushing motor again to push the material; and rotating a rotation disc with a rotation disc motor by 90 degrees;
step 5: resetting the rotating valve 304 with the rotating valve motor; starting an external cylinder motor and an internal cylinder motor to respectively move an external cylinder and an internal cylinder downwardly, so as to push the stuffing into the dough wrappers;
step 6: after pushing the stuffing into the dough wrappers, resetting the external cylinder motor and the internal cylinder motor;
step 7: rotating the rotation disc 101 with the rotation disc motor by 90 degrees;
step 8: using a pressing motor to press and fold the dumplings for a while before releasing;
step 9: rotating the rotation disc 101 with the rotation disc motor by 90 degrees;
step 10: moving the dumplings to a discharge station by a discharge motor, staring a clamping motor to clamp;
step 11: resetting the discharge motor and the clamping motor, and storing the dumplings;
step 12: rotating the rotation disc 101 with the rotation disc motor by 90 degrees, so as to finish a whole process; and
step 13: backing to the step 1, and repeating.

The sending motor drives the dough feeding rollers 210 of the sending and cutting part 200.

The stirring motor drives the screw conveyor 315 inside the hopper 302 of the stuffing injection part 300.

The sucking and pushing motor drives the transverse injecting rod 308 of the stuffing injection part 300 to move horizontally.

The cutting motor drives the cutter 204 of the sending and cutting part 200 to move up and down, so as to cut the dough wrappers.

The rotating valve motor drives the rotating valve 304 of the stuffing injection part 300 to rotate.

The rotation disc motor drives the rotation disc 101 of the rotation assembly 100 to rotate.

The external cylinder motor drives the longitude injecting tube 309 of the stuffing injection part 300 to move up and down.

The internal motor drives the longitude injecting rod 313 of the stuffing injection part 300 to move up and down.

The pressing motor drives the pressing mold 402 of the pressing and shaping part 400 to press and release.

The discharge motor drives a clamping structure of the discharge part 500 to move.

The clamping motor drives the clamping structure of the discharge part 500 to clamp and release.

The above-mentioned motors are servo motors.

What is claimed is:

1. A method for forming stuffed food, comprising steps of:
step 1: sending and cutting dough wrappers; wherein shaping molds (1001) on a rotation disc (101) are arranged below a sending and cutting station (20); the dough wrappers are cut into pre-set shapes before dropping in the shaping molds (1001); unused dough enters an opening (106) on the rotation disc (101) and is transported downwardly, so as to be collected;
step 2: filling the dough wrappers with stuffing; wherein the shaping molds (1001) transport the dough wrappers to a stuffing injection station (30) where the stuffing is injected onto the dough wrappers;
step 3: pressing and shaping; wherein the shaping molds (1001) are transported by the rotation disc (101) to a shaping station (40) where the dough wrappers are pressed and shaped; and
step 4: outputting final products; wherein the shaping molds (1001) are transported to a discharge station (50), so as to output the final products;
wherein a forming machine is used to perform the method, comprising: a rotation assembly (100), wherein at least the sending and cutting station (20) and the stuffing injection station (30) are arranged around the rotation assembly (100); the rotation assembly (100) has the opening (106) for collecting the unused dough from the sending and cutting station (20); a distance between an internal side of the shaping molds (1001) and a center of the rotation assembly (100) is larger than a distance between an internal side of the opening (106) and the center of the rotation assembly (100);
wherein the rotation assembly (100) comprises the rotation disc (101); the shaping molds (1001) are evenly distributed on the rotation disc (101); the rotation disc (101) has the opening (106) for collecting the unused dough; wherein a distance between the internal side of the shaping molds (1001) and a center of the rotation disc (101) is larger than a distance between the internal side of the opening (106) and the center of the rotation disc (101);
wherein a structure of the opening (106) is continuously arranged on the rotation disc (101); and the opening (106) is circular or loop-shaped;
wherein the motor drives the rotation disc (101) to rotate the shaping molds (1001) which is connected to the rotation disc (101); the unused dough after cutting enters the opening (106) on the rotation disc (101), so as to be collected; a base (102) and a guiding plate (103) under the rotation disc (101) is independent thereto, which are static during working; guiding rails are provided on both the base (102) and the guiding plate (103); guiding rollers on the shaping molds (1001) are guided by the guiding rails to drive a catch plate (1004) and the shaping molds to move up and down respectively.

2. A method for forming stuffed food, comprising steps of:
step 1: sending and cutting dough wrappers; wherein shaping molds (1001) on a rotation disc (101) are arranged below a sending and cutting station (20); the dough wrappers are cut into pre-set shapes before dropping in the shaping molds (1001); unused dough enters an opening (106) on the rotation disc (101) and is transported downwardly, so as to be collected;
step 2: filling the dough wrappers with stuffing; wherein the shaping molds (1001) transport the dough wrappers to a stuffing injection station (30) where the stuffing is injected onto the dough wrappers;
step 3: pressing and shaping; wherein the shaping molds (1001) are transported by the rotation disc (101) to a shaping station (40) where the dough wrappers are pressed and shaped; and step 4: outputting final products; wherein the shaping molds (1001) are transported to a discharge station (50), so as to output the final products;

wherein a forming machine is used to perform the method, comprising: a rotation assembly (100), wherein at least the sending and cutting station (20) and the stuffing injection station (30) are arranged around the rotation assembly (100); the rotation assembly (100) has the opening (106) for collecting the unused dough from the sending and cutting station (20); a distance between an internal side of the shaping molds (1001) and a center of the rotation assembly (100) is larger than a distance between an internal side of the opening (106) and the center of the rotation assembly (100);

wherein the rotation assembly (100) comprises the rotation disc (101); the shaping molds (1001) are evenly distributed on the rotation disc (101); the rotation disc (101) has the opening (106) for collecting the unused dough; wherein a distance between the internal side of the shaping molds (1001) and a center of the rotation disc (101) is larger than a distance between the internal side of the opening (106) and the center of the rotation disc (101);

wherein a base (102) is arranged under the rotation disc (101); a guiding plate (103) between the base (102) and the rotation disc (101) is a cylinder; a first guiding rail (104) is provided on an external surface of the cylinder, and a second guiding rail (105) is provided on an edge of the base (102);

wherein each of the shaping molds (1001) comprises a catch plate (1004) and a molding cup (1005) settled in the catch plate (1004); wherein a bottom of the catch plate (1004) is connected to a first roller (1002) through a first connecting rod, and a bottom of the molding cup (1005) is connected to a second roller (1003) through a second connecting rod; since the shaping molds (1001) rotates with the rotating disc (101) while the guiding plate (103) and the base (102) remain still, the catch plate (1004) moves up and down along a wave-shaped track in the first guiding rail (104) on the external surface of the guiding plate (103) with the first roller (1002); the second guiding rail (105) cooperates with the second roller (1003) to move molding cup (1005) up and down; as a result, different parts of the shaping molds (1001) move up and down at different stations.

3. A method for forming stuffed food, comprising steps of:

step 1: sending and cutting dough wrappers; wherein shaping molds (1001) on a rotation disc (101) are arranged below a sending and cutting station (20); the dough wrappers are cut into pre-set shapes before dropping in the shaping molds (1001); unused dough enters an opening (106) on the rotation disc (101) and is transported downwardly, so as to be collected;

step 2: filling the dough wrappers with stuffing; wherein the shaping molds (1001) transport the dough wrappers to a stuffing injection station (30) where the stuffing is injected onto the dough wrappers;

step 3: pressing and shaping; wherein the shaping molds (1001) are transported by the rotation disc (101) to a shaping station (40) where the dough wrappers are pressed and shaped; and step 4: outputting final products; wherein the shaping molds (1001) are transported to a discharge station (50), so as to output the final products;

wherein a forming machine is used to perform the method, comprising: a rotation assembly (100), wherein at least the sending and cutting station (20) and the stuffing injection station (30) are arranged around the rotation assembly (100); the rotation assembly (100) has the opening (106) for collecting the unused dough from the sending and cutting station (20); a distance between an internal side of the shaping molds (1001) and a center of the rotation assembly (100) is larger than a distance between an internal side of the opening (106) and the center of the rotation assembly (100);

wherein the pressing and shaping part (400) comprises a supporting pillar (401) and a pair of pressing molds (402) which are fixed on the supporting pillar (401); a gear (403) is provided on a top of each of the pressing molds (402); pressing blocks (404) are provided on bottoms of the pressing molds (402); gears of the pressing molds (402) are engaged with each other; the pressing blocks (404) of the pressing molds (402) are opposite to each other; a top of at least one of the pressing molds (402) is connected to a motor; pressing surfaces of the pressing blocks (404) are curved, wherein one of the pressing blocks (404) is laterally concave while the other of the pressing blocks (404) is laterally convex; the gear (403) is provided on each of two semicircle rotating plates (405); curved surfaces of the two rotating plates (405) are opposite to each other.

4. The method, as recited in claim 3, wherein the motor drives the top of one of the pressing molds (402) to rotate; since the gear (403) on the top of each of the pressing molds (402) is engaged with each other, the top of the other of the pressing molds (402) is driven to rotate, in such a manner that the pressing blocks (404) below press each other; the pressing surfaces of the pressing blocks (404) are curved, so as to form wave shapes at sealed edges of the dough wrappers when pressing.

\* \* \* \* \*